May 29, 1962  R. W. HILL  3,036,455
METERING SYSTEM

Filed July 30, 1958  2 Sheets-Sheet 1

RALPH W. HILL
INVENTOR.

BY *L. C. Goodwin*

ATTORNEY

RALPH W. HILL
INVENTOR.

BY *Goodwin*

ATTORNEY ary 29, 1962

3,036,455
METERING SYSTEM
Ralph W. Hill, Tulsa, Okla., assignor to Pan American Petroleum Corporation, Tulsa, Okla., a corporation of Delaware
Filed July 30, 1958, Ser. No. 751,945
12 Claims. (Cl. 73—3)

This invention relates to an apparatus for automatically metering liquid. More particularly this invention pertains to a metering system in which the flow of fluid through a meter is passed preferably periodically through a prover meter and in which flow through the meter is automatically terminated if the two meters are not in substantial agreement on the quantity of fluid.

Various types of metering systems for measuring the volume or weight of liquid have been proposed. Recently there has been a trend toward automatic measurement of petroleum as the petroleum is transferred from the producer to the pipeline or purchaser. The measurement of petroleum is inherently difficult due to the inclusion of abrasive solids typically floating sand and to the deposition of wax and asphaltic solids in the meter. For this reason, in service these meters tend to drift and thus produce an inaccurate indication of the quantity of liquid passing through the meter. It is therefore considered desirable, at least periodically, to connect these meters to a prover tank which has previously been accurately calibrated. If the quantity of liquid passing through the meter is not within a predetermined range (usually within an error less than about ±0.01–0.10%) as indicated by the prover tank, the meter is adjusted or corrected to produce an accurate measurement. One of the particular advantages of automatic metering systems for measuring petroleum is that they may run for several days, typically a month or more, without any kind of attention. However, since meters in this service do drift and become inaccurate due to wear and/or the deposition of solids from the metered liquid, it is generally considered desirable to check the accuracy of the meter more often than the meter would otherwise be inspected or observed.

It is therefore an object of this invention to provide an improved metering system. It is a more specific object of this invention to provide a metering system in which the accuracy of a primary meter is periodically checked against a standard or carefully calibrated prover meter and in which flow through the meter is automatically terminated when the accuracy is not within predetermined limits. Other objects of this invention will become apparent from this description. In this description reference will be made to the accompanying drawings in which.

Figure 1:
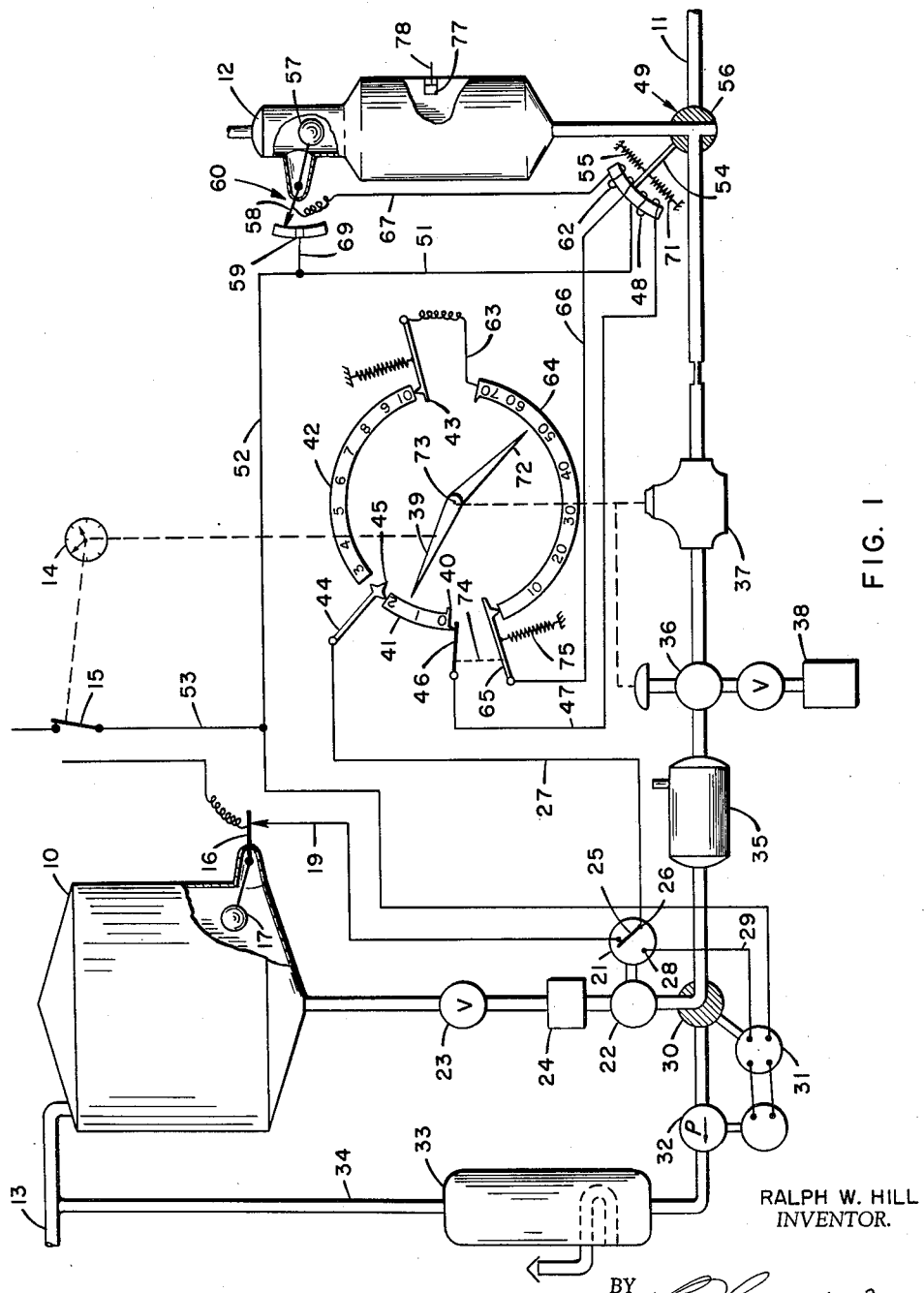
FIGURE 1 is a schematic diagram of a metering system showing means for automatically comparing the volume of liquid as indicated by a meter with a standard volume and for controlling flow through the system, depending upon the accuracy of the meter.
Figure 5:
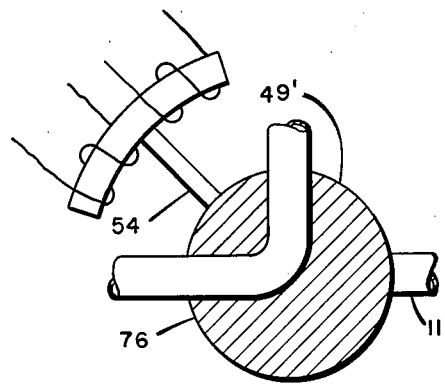
Figure 6:
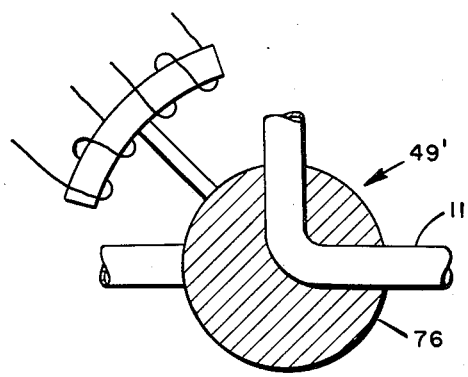

FIGURE 5 is a cross-sectional view of a two-position three-way valve in the discharge line of an alternate embodiment of the metering system shown in FIGURE 1, the valve member being in a position to admit liquid from the primary meter to a prover tank; and FIGURE 6 is a cross-sectional view of the valve shown in FIGURE 5 with the valve member in a position to permit oil to flow from the prover tank to the pipeline.

In brief this invention may be described as a liquid metering system in which the accuracy of a displacement meter is checked, preferably at least once daily, by automatically comparing its measurement of volume with the volume of a standard meter which is typically a prover tank. When the displacement meter becomes worn or otherwise inaccurate so that the volume of throughput as indicated by the standard does not fall within predetermined limits, flow through the meter is stopped automatically.

Referring now to FIGURE 1 for a more detailed description of the invention, a preferred embodiment of a metering system is shown schematically in the flow line between a liquid supply such as a lease tank 10 and a pipeline 11. The lease tank 10 is preferably elevated to a position above the top of the prover tank 12 so that liquid, typically crude oil, flows by gravity through the metering system to the pipeline 11. The lease tank may, of course, be located at the elevation of or below the prover tank and a pump may be used to displace the liquid from the lease tank into the prover tank and/or the pipeline. The lease tank is filled from a flow line 13 connected into the lease tank at the top. Liquid entering the lease tank typically comes directly from a well or indirectly from a well through a treating system in which undesirable gases, liquids, and solids are removed so that the liquid in lease tank 10 is "pipeline" oil having a quality which falls within predetermined standards or limits of basic sediment and water content.

Figure 2:
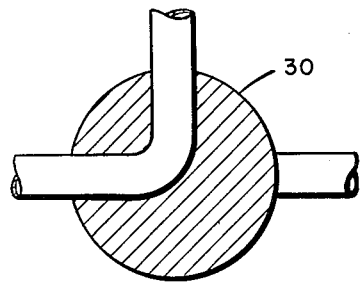
FIGURE 2 is a cross-sectional view of a two-position three-way valve in a position to bypass the metering system as shown in FIGURE 1 when the quality of the metered liquid is not up to a predetermined standard.

At some predetermined time as previously agreed upon by the seller and the purchaser of the liquid passing through the metering system, the clock 14 closes switch 15 to energize the metering system controls. For convenience this control system will be described in its preferred embodiment which is electrical, but it will be understood that pneumatic and other well-known control systems may be substituted. A low-level cut-off switch 16 in the lease tank is actuated by a float 17 in some cases to shut down the system when the liquid supply is low and in turn when the liquid supply in tank 10 is above a predetermined minimum to energize the electrical conductor 19 and a single-pole double-throw switch 21 on a monitor 22. This monitor determines the quality of the liquid flowing from the lease tank through the master cut-off valve 23 and the strainer 24, usually by conductivity or capacitance measurements of the liquid. When the quality of the oil is above a predetermined standard the switch blade 25 is held by the monitor in the right position in communication with contact 26 to energize conductor 27. When the quality of the oil passing through the monitor 22 is below the predetermined standard, the monitor moves the switch blade to the left into communication with contact 28 to energize conductor 29 and the two-position three-way valve 30 is rotated by the controller 31 to the position shown in FIGURE 2 so that substandard liquid from the lease tank is diverted through pump 32 and treater 33 for removal of the impurities which reduce it to a substandard quality. The treated liquid then flows via riser 34 back to the flow line 13 and thence into the lease tank 10.

The two-position three-way valve 30 is, under normal operating conditions where the quality of the liquid is up to sandard, in the position shown in FIGURE 1 so that liquid flows to a vent tank 35. In this vent tank any entrained gases are separated and exhausted into the atmosphere. Dead oil from the vent tank passes through a sampling pump 36 and thence to a main or primary meter 37. This meter is typically a displacement meter but may be any of a number of types in which a motion, typically a rotary motion, proportional either to a standard unit of volume or weight is produced. A rotation proportional to net barrels which is gross barrels corrected for variations in temperature is preferred. The sampling pump 36 is linked mechanically to and actuated by the volume indicator system of the primary meter 37 so that periodically an aliquot part of the liquid flowing through the metering system is discharged by the pump into a sample container 38. This sample container may be periodically emptied or disconnected from the system and the contents analyzed to determine the properties of the average fluid flowing through the system over a long period of time.

The rotation of an impeller or other measuring device within the meter 37 is transmitted mechanically to a daily indicator arm 39 which rotates clockwise in proportion to the number of barrels, preferably net barrels, of liquid flowing through the meter. At the beginning of each production interval which is customarily once each day, the daily indicator arm 39 is returned either manually or preferably automatically by clock 14 to the zero stop 40. Flow through the meter then advances this daily indicator arm clockwise so that it indiactes on indexes 41 and 42 in barrels, the flow through the meter during a predetermined first period. In the measurement of petroleum this first period is typically a day and the circuit breaker 43 is set on index 42 at a position which typically corresponds to the daily allowable of a lease or other units producing through the meter.

Figure 3:
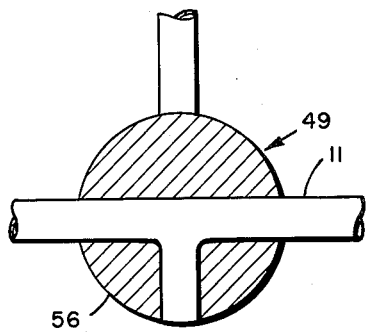
FIGURE 3 is a cross-sectional view of a three-position three-way valve in the discharge line of the metering system shown in FIGURE 1, the valve member being in a position to pass liquid to a downstream pipeline.
Figure 4:
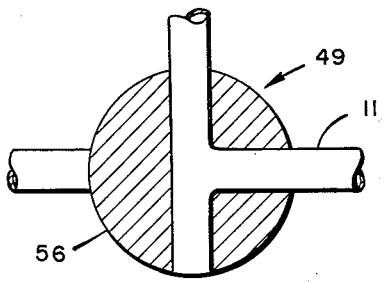
FIGURE 4 is a cross-sectional view of the valve shown in FIGURE 3 with the valve member in a position to prevent flow of liquid from the primary meter to the pipeline.

Since it is desirable to check the accuracy of meter 37 often, at least once per day, a single-pole double-throw snap-acting switch 44 which is connected to conductor 27 is placed so that the daily indicator arm 39 contacts a flexible extension 45 on the blade member. This switch blade member is adapted to snap into its two positions. In the first position as shown, after the daily indicator arm has been returned to zero, the blade member contacts the end of metallic test index 41. In this position power from the conductor 27 flows through the metallic index, the closed switch 46, and the conductor 47 to a test coil 48 of the position controller on three-position three-way valve 49 and thence via conductors 51, 52, and 53 back to switch 15. When the test coil 48 is thus energized, the position control arm 54 of the three-position three-way valve 49 is displaced counter-clockwise against the action of tension spring 55 to rotate the valve member 56 to the position shown in FIGURE 1 so that fluid discharging from the primary meter 37 flows only into the prover tank 12. The length of the index 41 or the position of the single-pole double-throw snap-acting switch 44 on a continuous daily index corresponds to the volume of the prover tank. As the metered liquid then enters the prover tank the daily indicator arm 39 moves clockwise from the zero stop until it strikes the flexible extension 45. At the instant the contact between the switch blade and the metallic test index 41 is broken, the liquid level in the prover tank has lifted the float 57 and rotated the brush 58 so that it contacts the electrode 59 of a level controller switch 60. At the same instant the blade member of the single-pole double-throw snap-acting switch 44 is snapped into contact with the metallic daily index 42. This deenergizes the test coil 48 and energizes the daily coil 62 of the three-way valve controller via closed circuit breaker 43, conductor 63, a metallic monthly index 64, the monthly allowable circuit breaker 65, conductors 66 and 67, the level controller switch 60, conductors 69, 52, and 53 in series back to switch 15. When this daily coil 62 is thus energized the position control arm 54 of the three-way valve 49 is rotataed clockwise against the action of tension spring 71 to rotate the valve member 56 to the position shown in FIGURE 3 so that liquid from meter 37 can pass into pipeline 11. The arc length of electrode 59 is limited so that brush 58 is in contact therewith only while the liquid level in the prover tank is within the predetermined limits permitted for variations, over and under, from a standard volume. If the liquid level in the prover tank is not within these limits when the blade member of the single-pole double-throw snap-acting switch 44 snaps into its second position in contact with the metallic daily index 42, then the circuit through the daily coil 62 is open when the circuit through the test coil 48 opens. Under this condition, tension springs 55 and 71 rotate the position control arm 54 and the valve member 56 to an intermediate position, as shown in FIGURE 4 so that flow through meter 37 is stopped for that day, or to some other position in which flow to the pipeline 11 is prevented unless action is taken to correct the error indicated. Means may be provided to stop the clock or otherwise open the test circuit so that no liquid can flow through the system until the error is corrected. This situation exists regardless of whether the liquid level in prover tank 12 is above or below the range of permissible variation.

Whenever the accuracy of meter 37 is within the predetermined limits the valve member 56 of three-way valve 49, as indicated previously, is rotated to permit flow from the primary meter and, if desired, from the secondary meter or prover tank, to the pipeline. Additional flow through the primary meter then rotates the daily indicator arm 39 clockwise past the flexible extension 45 in a clockwise direction. It continues to rotate in this direction until it strikes and opens circuit breaker 43. With this circuit breaker open the daily coil 62 is deenergized allowing the tension springs 55 and 71 to rotate the valve member 56 of three-way valve 49 to a neutral position as shown in FIGURE 4 or to some other position which stops flow through the meter system. With the valve member in the position shown in FIGURE 4 flow through to the primary meter is stopped and the liquid in the prover tank flows by gravity into pipeline 11. No additional fluid will be passed through the meter system until the valve member 56 of three-way valve 49 is returned to the position shown in FIGURE 1. This valve member is rotated back to that position either manually or by the clock 14 rotating the daily indicator arm 39 back to the zero stop 40 at the commencement of the next day's run. As the daily indicator arm 39 passes the flexible extension 45 the blade member of the single-pole double-throw snap-acting switch 44 is snapped back to its first position as shown in contact with the metallic test index 41 so that coil 48 is again energized and the valve member 56 in three-way valve 49 is rotated counter-clockwise from its neutral position as shown in FIGURE 4 or some other selected position to the test position as shown in FIGURE 1. In this test position the first quantity of liquid through the meter 37 is directed to the prover tank to again determine if the primary meter is within the predetermined limits of accuracy. If the meter is within these limits the valve member 56 is again automatically positioned to run the daily allowable through the meter to the pipeline 11 as described above.

As is well known in this art, most leases or other producing units typically are prorated to a maximum monthly allowable production. A monthly indicator arm 72 which is frictionally or otherwise fixed to the rotating shaft 73 of meter 37 is set at the first of each such proration period by rotating it counterclockwise to the monthly allowable in barrels as indicated on the metallic monthly index 64. This indicator arm is then rotated clockwise as liquid is metered until the arm contacts and opens the circuit breaker 65. At this time both test coil 48 and daily coil 62 are again deenergized and the valve member 56 of the three-way valve 49 is returned to a neutral position as shown in FIGURE 4, stopping further flow through the metering system until the monthly indicator arm 72 is again manually reset counterclockwise to the new monthly allowable. When the monthly allowable is produced in less than a month, circuit breaker 65 is held open by the monthly indicator arm 72. Since switch 46 in the prover tank circuit is connected by a linkage 74 with this circuit breaker, switch 46 is also held open to avoid refilling the prover tank until the monthly indicator arm is again reset. At that time the switch 46 and the circuit breaker 65 may be closed either manually or by a tension spring 75.

In some cases, particularly in those cases where a lease produces less than about 50–100 barrels per day, it is often convenient to flow all of the liquid through both the primary meter and the secondary meter in series. In an embodiment of the above-described metering system, the mean or standard volume position of the float 57 in prover tank 12 is set to close level control switch 60 when the liquid level in the prover tank is at the daily allowable. In this embodiment, the three-way valve member 56 in the three-position valve 49 is replaced by a two-way valve member 76 in the three-position valve 49'. Two positions of the valve member are shown in FIGURES 5 and 6. In the position shown in FIGURE 5 the control arm 54 has been rotated in a counterclockwise direction by energizing test coil 48 when the daily indicator arm 39 was returned to its zero position at the commencement of a daily run. As liquid flows through meter 37 into the prover tank 12, daily indicator arm 39 rotates clockwise until it strikes the flexible extension 45. When the daily allowable, as measured by the meter 37, has passed into the prover tank 12, the blade member of single-pole double-throw snap-acting switch 44 is moved by the daily indicator arm 39 to a position out of contact with test index 41 and into contact with the daily index 42. In this position if the level of the liquid in the prover tank is within the predetermined limits, daily coil 62 is energized and the two-way valve member 76 is rotated by control arm 54 in a clockwise direction to the position shown in FIGURE 6. The liquid in the prover tank is then discharged into the pipeline 11. Also with the two-way valve member 76 in this position, fluid flow through meter 37 is stopped and cannot be started until the daily indicator arm 39 is returned to its zero position. As the indicator arm is returned to the zero position the switch blade of switch 44 is returned by a spring or other means (not shown) into contact with test index 41. This de-energizes daily coil 62 and energizes test coil 48 to rotate the two-way valve member 76 in three-position valve 49' back to its original position as shown in FIGURE 5. In this embodiment, the length of the test index 41 or the position of the single-pole double-throw snap-acting switch 44 on the daily index 42 is thus placed to correspond with the daily allowable in barrels and with the volume of the prover tank at the mean or standard-volume position of float 57 so that one prover tank full of liquid can be run each day between each resetting of the daily indicator arm 39.

The volume of liquid flowing through meter 37 may be indicated by the daily indicator arm or recorded directly as the gross volume of liquid through the meter. In this embodiment, the flow through the meter, as indicated by the daily indicator arm 39, can be compared directly with the volume of liquid in the prover tank 12. The volume of liquid as indicated by the monthly indicator arm or as recorded is, however, desirably net volume, i.e., gross barrels corrected for temperature, etc. In the preferred embodiment the volume of liquid through meter 37 as indicated by both the daily indicator arm 39 and the monthly indicator arm 72 is corrected for temperature and/or other variables so that this net volume cannot be compared directly with uncorrected or gross volume of liquid in the prover tank. Various means may be provided for correlating these two quantities. For example, means such as a cylinder 77 having a piston 78, which moves in proportion to the necessary correction factor, may be provided in the prover tank to vary the volume of the prover tank to compensate for such variables.

From the foregoing description of various schematic embodiments of my invention, it can be seen that the invention is susceptible of a wide variety of embodiments. It can also be seen that while many of the elements of the invention are shown schematically, commercially available elements which perform the functions indicated are actually contemplated and that the substitution of such commercially available elements are within the spirit and intent of this invention. This invention should, therefore, be construed not to be limited to the embodiments herein described. It should instead be construed to be limited only by the scope of the appended claims.

I claim:
1. A liquid metering system comprising a primary meter, a prover meter, conduit means including a valve connecting said meters in series, means including a normally closed discharge valve to connect said metering system into a pipeline, said valves being coupled to prevent their being simultaneously open, means to indicate the quantity of liquid entering said primary meter, means to indicate the quantity of liquid entering said prover meter, and control means actuated by at least one of said primary meter and said prover meter to open said discharge valve and discharge liquid from said metering system into said pipeline only when the indicated quantity of liquid entering said primary meter is substantially equal to the indicated quantity of liquid entering said prover meter.

2. A liquid metering system comprising a primary meter, a prover meter, conduit means including a valve connecting said meters in series, means including a normally closed discharge valve to connect said metering system into a pipeline, said valves being coupled to prevent their being simultaneously open, means to indicate the quantity of liquid entering said primary meter, means to indicate the quantity of liquid entering said prover meter, and control means actuated by at least one of said primary meter and said prover meter to maintain said discharge valve closed and prevent flow into said pipeline when the indicated quantity of liquid entering said primary meter is not substantially equal to the indicated quantity of liquid entering said prover meter.

3. A liquid metering system comprising a primary meter, a prover meter, conduit means including a valve connecting said meters in series, means including a normally closed discharge valve to connect said metering system into a pipeline, said valves being coupled to prevent their being simultaneously open, means to indicate the passage through said primary meter of a predetermined quantity of liquid as measured by said primary meter at current operating conditions, means to indicate when a standard quantity of liquid has passed into said prover meter, first control means actuated by at least one of said primary meter and said prover meter to open said discharge valve and discharge liquid from said metering system into said pipeline when said predetermined quantity of liquid is substantially equal to said standard quantity of liquid, and second control means actuated by at least one of said primary meter and said prover meter to maintain said discharge valve closed and prevent flow through said primary meter when said predetermined quantity of liquid is not substantially equal to said standard quantity of liquid.

4. A liquid metering system comprising a primary meter, a prover meter, conduit means including a valve connecting said meters in series, means including a normally closed discharge valve to connect said metering system into a pipeline, said valves being coupled to prevent their being simultaneously open, means to indicate the passage through said primary meter of a predetermined quantity of liquid as measured by said primary meter at current operating conditions, means to indicate a standard quantity of liquid in said prover meter, and control means actuated by at least one of said primary meter and said prover meter to open said discharge valve and discharge liquid from said metering system into said pipeline, only when said predetermined quantity of liquid is substantially equal to said standard quantity of liquid in said prover meter.

5. A liquid metering system for measuring the flow of liquid into a pipeline comprising a primary meter, a prover meter, conduit means including a valve connecting said meters in series, means including a normally closed discharge valve to connect one of said primary meter and said prover meter into said pipeline, said valves being coupled to prevent their being simultaneously open, means to indicate the passage through said primary meter of a predetermined quantity of liquid as measured by said primary meter at current operating conditions, means to indicate a standard quantity of liquid in said prover meter, said predetermined quantity of liquid normally being equal to said standard quantity of liquid, and control means actuated by at least one of said primary meter and said prover meter to open said discharge valve and pass liquid from one of said primary meter and said prover meter to said pipeline only when said predetermined quantity of liquid is substantially equal to said standard quantity of liquid.

6. A liquid metering system comprising a displacement meter and downstream thereof a prover tank, conduit means including a valve connecting said meter and said tank in series, means to produce a signal after a predetermined quantity of liquid, as measured at current operating conditions, has passed through said displacement meter, liquid-level responsive means preset to pass said signal only when the quantity of liquid in said prover tank is substantially a standard quantity which is normally equal to said predetermined quantity of liquid, a normally closed discharge valve connected to control the flow of said liquid from said metering system into said pipeline, said valves being coupled to prevent their being simultaneously open, and means responsive to said signal to open said discharge valve and pass liquid through said displacement meter and into said pipeline only when said quantity of liquid as measured at current conditions by said displacement meter is substantially equal to said standard quantity.

7. A liquid metering system comprising a displacement meter, a prover tank, three-way valve means in a first position to connect said displacement meter and said prover tank to a pipeline and selectively in a second position to connect said displacement meter to said prover tank, means to produce a signal after a predetermined quantity of liquid, as measured at current conditions, has passed from said displacement meter through said valve in said second position into said prover tank, liquid level controlled switch means associated with said prover tank and preset to pass said signal only when the quantity of liquid in said prover tank is substantially a standard quantity of liquid which is normally equal to said predetermined quantity of liquid as measured by said displacement meter, and means responsive to said signal when passed through said liquid level controlled switch means to switch said valve from said second position to said first position and pass liquid to said pipeline only when said predetermined quantity of liquid, as measured at current conditions, is substantially equal to said standard quantity of liquid in said prover tank.

8. An apparatus for periodically determining the accuracy of a positive displacement meter comprising a prover tank, conduit means including a three-way valve in a first position selectively to connect said positive displacement meter to said prover tank and in a second position selectively to connect at least one of said positive displacement meter and said prover tank to a pipeline, rotary means for indicating the quantity of liquid passing through said positive displacement meter, a test index associated with said rotary means to produce a signal upon the passage of a predetermined quantity of liquid, as measured under current operating conditions, through said positive displacement meter with said three-way valve in said first position, liquid level means in said prover tank, switch means connected to and closed by said liquid level means to pass said signal only when the liquid in said prover tank is at a predetermined level, and means to rotate said valve to said second position and discharge liquid from one of said positive displacement meter and said prover tank only when said signal produced by said test index passes said switch means.

9. An apparatus for periodically determining the accuracy of a positive displacement meter comprising a prover tank, conduit means including a three-way valve selectively in a first position to connect said positive displacement meter to said prover tank and in a second position to connect at least one of said positive displacement meter and said prover tank to a pipeline, volume indicator means which moves in proportion to the quantity of liquid passing through said positive displacement meter, means associated with said indicator means to produce a signal upon the passage of a predetermined quantity of liquid, as measured under current operating conditions, from said positive displacement meter through said three-way valve in said first position to said prover tank, a valve controller for changing the positions of said three-way valve, liquid level indicator means for said prover tank, switch means connected to and closed by said liquid level indicator means to pass said signal to said valve controller and switch said valve from said first position to said second position only when said predetermined quantity of liquid is substantially equal to a standard quantity of liquid as measured in said prover tank.

10. In an apparatus for measuring the quantity of liquid flowing through a positive displacement meter into a pipeline, the improvement comprising means to periodically determine the accuracy of said positive displacement meter and to automatically terminate flow therethrough when said accuracy is outside predetermined limits, said means including a prover tank, a conduit to connect the discharge of said positive displacement meter to said prover tank, valve means in said conduit and said pipeline, liquid level means to indicate when the quantity of liquid in said prover tank is substantially equal to a predetermined standard volume, and controller means first to switch said valve means for discharging all the liquid from said positive displacement meter into said prover tank and second to switch said valve means for discharging all the liquid from said positive displacement meter into said pipeline when a predetermined quantity of liquid, as measured under current operating conditions, has passed through said positive displacement meter and into said prover tank, said controller means being actuated to switch said valve means for discharging the liquid from said positive displacement meter into said pipeline only when said liquid level means indicates that the quantity of liquid in said prover tank is substantially equal to said predetermined standard volume.

11. An apparatus according to claim 10 including means to actuate said controller means and switch said valve means for again discharging all of the liquid from said positive displacement meter back into said prover tank after a predetermined quantity of liquid has been discharged into said pipeline.

12. An apparatus according to claim 10 including clock means to periodically actuate said controller means and switch said valve means for again discharging the liquid from said positive displacement meter back into said prover tank after a time in which said liquid from said positive displacement meter has been discharging into said pipeline.

References Cited in the file of this patent
UNITED STATES PATENTS

| | | |
|---|---|---|
| 1,876,512 | Pfening et al. | Sept. 6, 1932 |
| 2,635,454 | Ford | Apr. 21, 1953 |